INVENTORS
Russell E. Jordan
Clyde L. Taylor

Attorneys

May 18, 1965 R. E. JORDAN ETAL 3,183,654
APPARATUS FOR RECOVERING COTTON WHICH HAS FALLEN TO THE GROUND
Filed Oct. 9, 1962 3 Sheets-Sheet 2
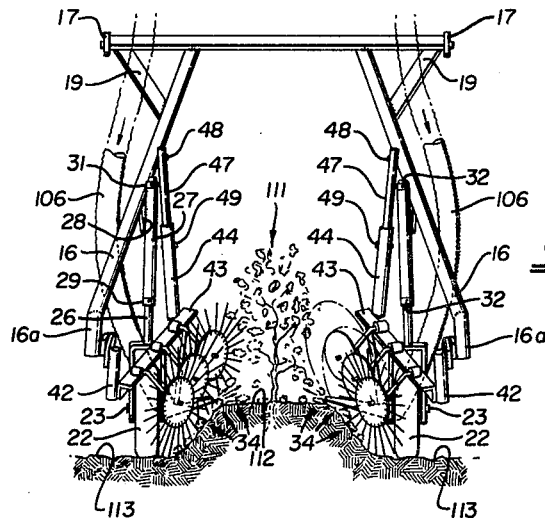
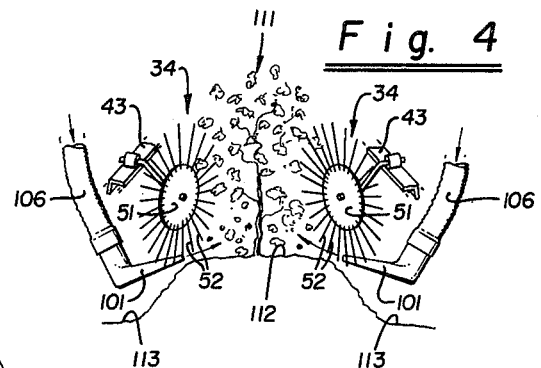
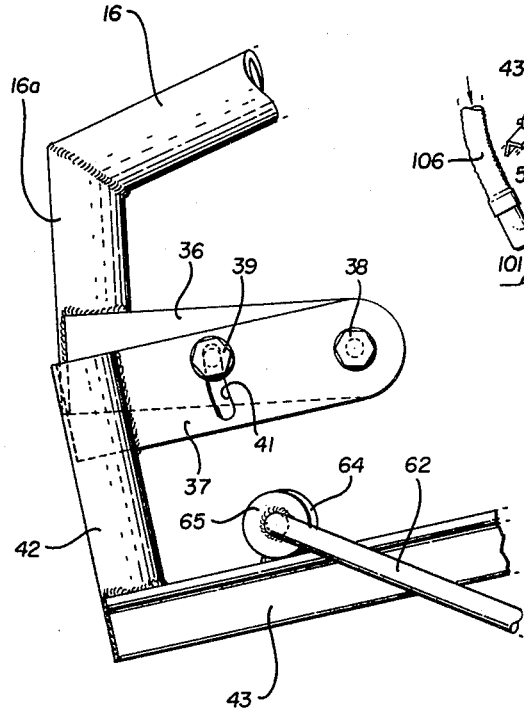
INVENTORS
Russell E. Jordan
BY Clyde L. Taylor
Attorneys May 18, 1965   R. E. JORDAN ETAL   3,183,654
APPARATUS FOR RECOVERING COTTON WHICH HAS FALLEN TO THE GROUND
Filed Oct. 9, 1962   3 Sheets-Sheet 3
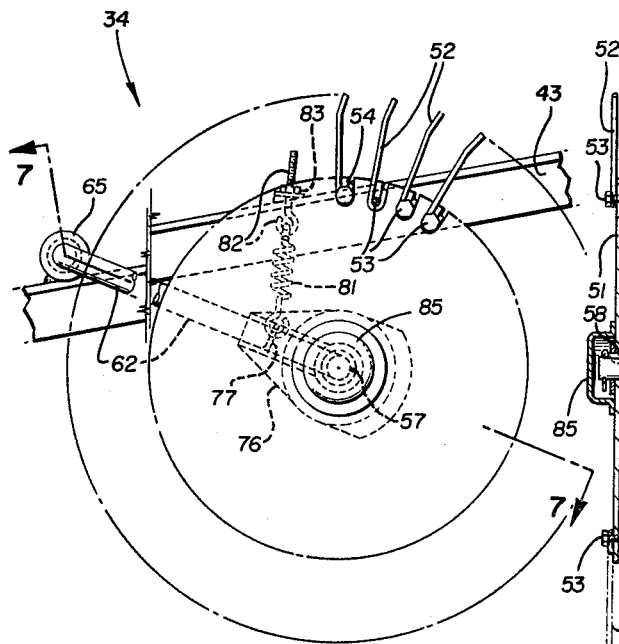
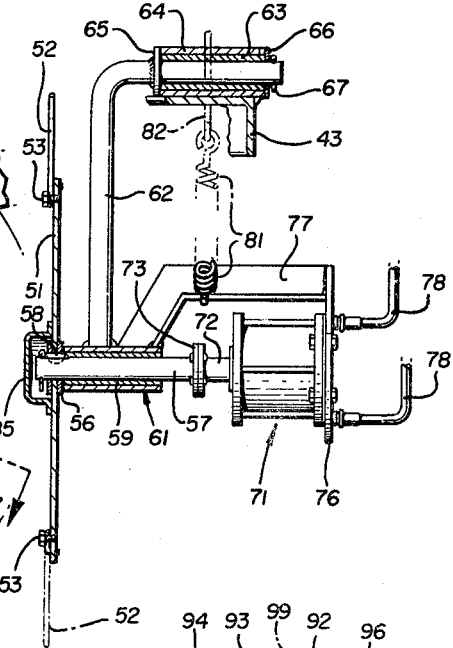
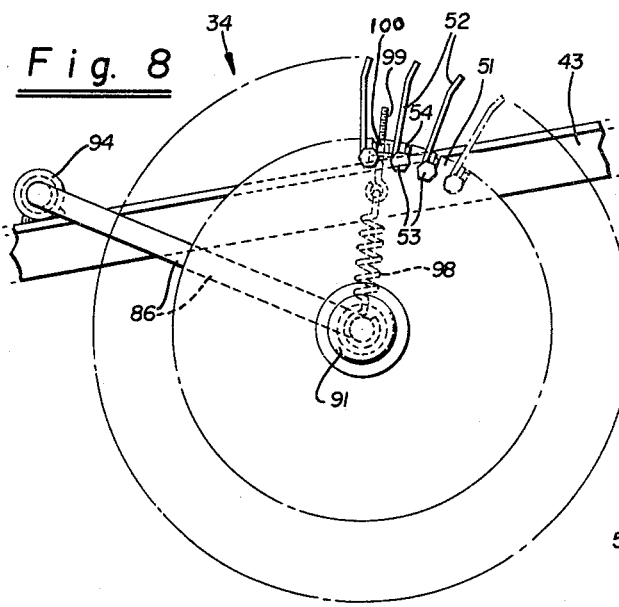
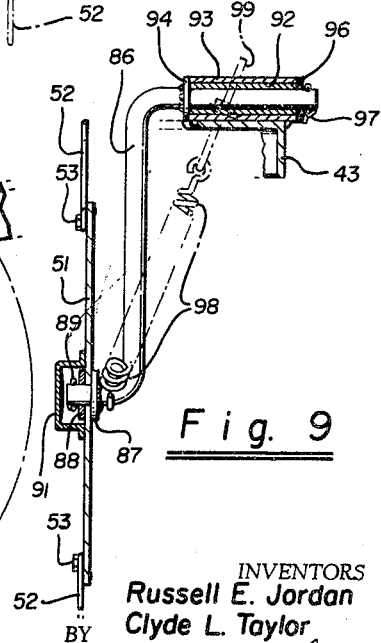
INVENTORS
Russell E. Jordan
Clyde L. Taylor
BY
Attorneys

United States Patent Office 3,183,654
Patented May 18, 1965

3,183,654
APPARATUS FOR RECOVERING COTTON WHICH HAS FALLEN TO THE GROUND
Russell E. Jordan, 285 W. I St., Brawley, Calif., and Clyde L. Taylor, 1545 S. Chinowith Road, Visalia, Calif.
Filed Oct. 9, 1962, Ser. No. 229,383
13 Claims. (Cl. 56—28)

This invention relates to an apparatus and method for recovering articles which have fallen to the ground and more particularly to an apparatus and method which can be utilized on a cotton picker for recovering cotton which has fallen to the ground.

As is well known to those skilled in the art of cotton picking, considerable cotton is knocked off of the plant and onto the ground during the picking season. These cotton bolls which are knocked onto the ground normally cannot be recovered with a conventional cotton picker. There is, therefore, a need for an apparatus and method which can be utilized for recovering cotton bolls which have fallen to the ground and particularly such an apparatus and method which can be utilized in conjunction with conventional cotton pickers.

In general, it is an object of the present invention to provide an apparatus and method for recovering articles which have fallen to the ground.

Another object of the invention is to provide an apparatus and method of the above character which is particularly adapted for recovering cotton bolls which have fallen to the ground.

Another object of the invention is to provide an apparatus and method of the above character which can be utilized with a conventional cotton picker.

Another object of the invention is to provide an apparatus and method of the above character in which the cotton bolls which are recovered are passed through the cotton picker.

Another object of the invention is to provide an apparatus of the above character which can be readily mounted on a cotton picker.

Additional objects and features of the invention will appear from the following description in which the preferred embodiment is set forth in detail in conjunction with the accompanying drawings.

Referring to the drawings:

FIGURE 3 is a partial front elevational view of the apparatus shown in FIGURE 1.

FIGURE 4 is a partial rear elevational view of the apparatus shown in FIGURE 1.

FIGURE 5 is an enlarged detail view of a portion of the apparatus.

FIGURE 6 is an enlarged detail view of one of the pickup members utilized in our apparatus.

FIGURE 7 is a cross-sectional view taken along the line 7—7 of FIGURE 6.

FIGURE 8 is a view similar to FIGURE 6 but showing a different embodiment of the pickup member.

FIGURE 9 is a cross-sectional view similar to FIGURE 7 of the embodiment shown in FIGURE 8.

Figures 1, 2:
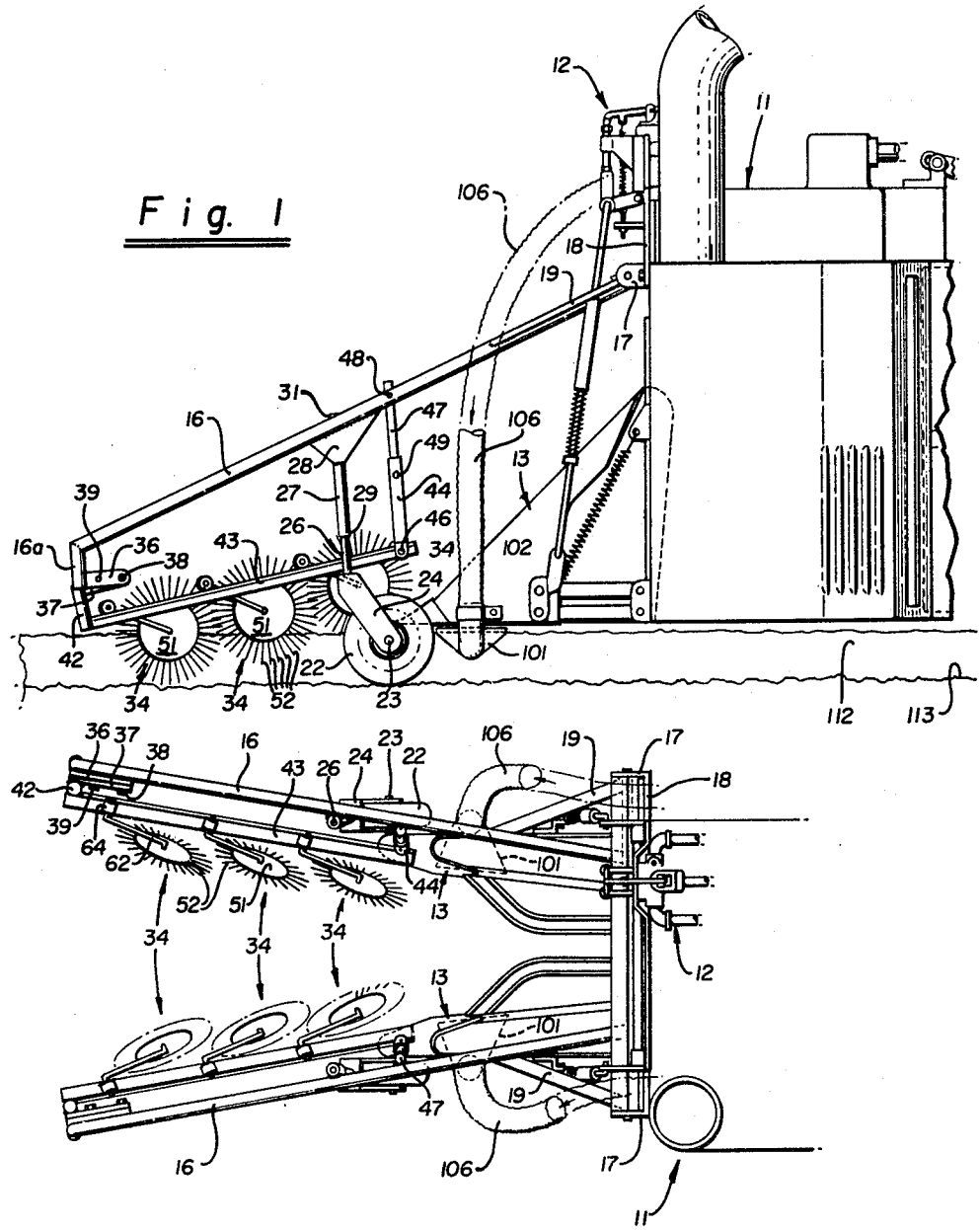
FIGURE 1 is a side elevational view of the apparatus for recovering cotton which has fallen to the ground incorporating our invention and which is mounted on the picker drum housing of a cotton picker.
FIGURE 2 is a top plan view of the apparatus shown in FIGURE 1.

In general, our apparatus for recovering articles which have fallen to the ground consists of a ground traversing vehicle. A pair of spaced apart arms are mounted on the vehicle in front of the vehicle. A plurality of rotatable article pickup members are mounted on each of the arms so that they are inclined with respect to the path of travel of the vehicle. As the vehicle is advanced, the pickup members are rotated to engage the articles and to move them inwardly between the two arms and into a row in the path of travel of the vehicle. Forced air means is provided for lifting the articles upwardly after they have been placed in the row so that they can be gathered by the vehicle.

More in particular, as shown in the drawings, our apparatus for recovering articles which have fallen to the ground consists of a conventional cotton picker which includes one or more picker mechanisms 11 depending upon whether the cotton picker is a single row or a double row cotton picker. Normally, one picker mechanism is provided for each row. The picker mechanism 11 as shown particularly in Patent No. 2,700,857 is normally mounted on a ground traversing vehicle (not shown) for moving the picker mechanism over the cotton plants for removing the bolls of cotton. The picker mechanism is mounted on the vehicle for vertical movement with respect to the vehicle so that it can be placed in an optimum picking position with respect to the cotton plants and the ground being traversed.

Means 12 of the type disclosed in Patent No. 2,972,847 is mounted upon the picker mechanism for automatically positioning the picker mechanism so that it is in an optimum picking position with respect to the ground level and the plant or plants being picked. As described in Patent No. 2,972,847, this means is connected to a pair of ground traversing plant lifters 13 which are mounted on each of the picker mechanisms. As the plant lifters 13 sense changes in the ground level, the picker mechanism is automatically positioned in accordance with the sensed ground level. The apparatus thus far described is substantially conventional and constitutes an operational environment with which our apparatus for recovering cotton which has fallen to the ground can be utilized.

Our apparatus for recovering cotton which has fallen to the ground consists of a pair of elongate arms 16 formed of a suitable material such as tubular steel. Each arm has one end secured to a member 21 pivotally mounted between a pair of ears 17 secured to a front mounting plate 18 which is secured on the upper front end of the picker mechanism 11 as shown particularly in FIGURE 1. The arms 16 are inclined downwardly and outwardly from the upper part of the picker mechanism and are provided with braces 19 to hold the arms in the desired lateral position. One end of each of the braces is secured to the associated arm and the other end is secured to the member 21 (see FIGURE 3).

Means is provided for supporting each of the arms 16 in a desired inclined position and consists of a ground engaging rubber-tired wheel 22. This rubber-tired wheel 22 is rotatably mounted upon a shaft 23 which extends through the ends of a bifurcated member 24. An upwardly extending shaft 26 is secured to the bifurcated member 24 and is slidably and rotatably mounted in a sleeve 27 which is fixed to a plate 28 secured to the associated arm 16. Collars 29 and 31 are slidably mounted on the shaft and are fixed in desired positions by screws 32. The collars 29 and 31 position the shaft 26 in the desired position in the sleeve 27 to thereby support the arm 16 at the desired inclined position.

Means is provided for mounting a plurality of rotatable pickup members 34 on each of the arms 16 and consists of a rearwardly extending member 36 which is secured to a downwardly extending portion 16a of the associated arm 16. A member 37 is pivotally connected to the member 36 by suitable means such as a bolt 38. The member 37 is retained in the desired angular position with respect to the member 36 by suitable means such as a bolt 39 which is mounted in the member 36 and which extends through a slot 41 provided in the member 37 as best shown in FIGURE 5.

A downwardly extending member 42 has its upper end secured to the outer end of the member 37 and has its lower end secured to an angular support member 43 which extends rearwardly in a direction substantially parallel to a vertical plane passing through the associated arm 16. Means is provided for supporting the rear end of the angle member 43 in a predetermined relationship with respect to the arm 16 and consists of a sleeve 44 which has its lower extremity pivotally connected to the rear end of the member 43 by a pin 46. A rod 47 slidably extends downwardly into the sleeve 44 and is pivotally connected to the arm 16 by a pin 48. The sleeve 44 is retained in a desired position on the rod 47 by a screw 49. By adjustment of the sleeve 44 on the rod 47, the rear end of the member 43 can be positioned in any desired position with respect to the associated arm 16 and the ground over which the apparatus is to traverse.

Each of the rotatable pickup members 34 consists of a circular plate 51 upon which are mounted a plurality of radially extending relatively flexible pickup members or tines 52. The tines or fingers 52 are secured to the plate 51 in a suitable manner such as by cap screws 53 which engage U-shaped portions of the members 52. Slots 54 are provided in the plate 51 which receive the other ends of the members 52 to prevent rotation of the members about the cap screws 53.

A hub 56 is mounted in the center of the plate 51 and is secured to a shaft 57 by suitable means such as key 58. The shaft 57 extends through a bushing 59 mounted within a housing 61. The housing is secured to the lower end of an L-shaped support member 62 which is rotatably mounted in a bushing 63 mounted in a cylindrical housing 64 secured on the upper side of the rearwardly extending member 43. A collar 65 is affixed to the member 62 on one side of the bushing 63 whereas a washer 66 and a cotter pin 67 are provided on the other end of the bushing 63 so that the member 62 is retained in the bushing 63 while permitting rotational movement of the member 62 in the bushing 63.

Means is provided for positively driving each of the rotatable pickup members 34 and consists of a hydraulic drive motor 71 which has an output shaft 72 that is secured to the shaft 57 by a connector 73. The motor 71 is supported in a suitable manner such as by securing the motor to a plate 76 which is affixed to an angle bracket 77. The other end of the bracket 77 is affixed to the housing 61.

Each of the motors 71 is connected by hoses 78 to a suitable source of hydraulic fluid under pressure (not shown) provided on the cotton picker and which can be controlled by a control valve (not shown) accessible to the operator so that the operator can control the speed of rotation of each of the rotatable pickup members 34.

Means is provided for adjusting the force with which each of the pickup members 34 engages the ground and consists of a spring 81 which has one end engaging the bracket 77 as is shown in FIGURES 6 and 7 and which has the other end engaging a threaded eye bolt 82 which is secured to the member 43 by nuts 83. The tension of the spring 81 can be adjusted by adjustment of the nuts 83.

A hub cap 85 is provided on the outer end of the shaft 57 for keeping out dust, dirt and the like.

An alternative arrangement for mounting the rotatable pickup members 34 is shown in FIGURES 8 and 9 in which the pickup members are not driven by separate motive drive means. They are driven by the fingers 52 engaging the ground over which they travel. In this embodiment the plates 51 are rotatably mounted on the one end of a supporting member 86 by suitable means such as a collar 87 which is affixed to the member 86 and disposed on one side of the plate and a washer 88 and a cotter pin 89 disposed on the other side of the plate. A cap 91 encloses the outer end of the member 86. The other end of the member 86 is rotatably mounted in a bushing 92 carried by a housing 93 affixed to the member 43. A collar 94 is affixed to the member 86 on one side of the bushing 92 and a washer 96 and a cotter pin 97 are provided on the member 86 on the other side of the bushing 92.

Means is also provided for adjusting the force with which the rotatable pickup member 34 engages the ground and consists of a spring 98 which has one end secured to the member 86 and has the other end secured to a threaded eye bolt 99 which is secured to the member 43 by nuts 100.

It will be noted particularly from FIGURES 2, 3 and 4 that the pickup members 34 are mounted upon the support members 43 so that they are inclined with their rear portions extending inwardly toward a line which passes through the center of the apparatus and the picker mechanism 11 and which is parallel to the path of travel of the apparatus. In addition, the pickup members are also canted or tilted so that their upper portions lean inwardly towards the center line of the apparatus. Also, the pickup members are so positioned that they have an overlapping or staggered relationship as shown particularly in FIGURE 3.

Means is provided for lifting the cotton bolls into the picker mechanism after the bolls have been picked up by the pickup members 34 and consists of a pair of flared nozzles 101 which are mounted behind the rotatable pickup members 34 and preferably adjacent the picker mechanism 11. For example, as shown, the nozzles 101 can be secured to the plant lifters 13 by suitable means such as a bracket 102. Alternatively if desired, the nozzles can be supported upon the rear ends of the members 43 if desired. By mounting the nozzles on the plant lifters 13, the nozzles will move up and down with the plant lifters and therefore will always be in a predetermined position with respect to the plant lifters and in an optimum position for lifting the cotton into the picker mechanism 11.

Suitable means is provided to supply forced air to the nozzles 101 and consists of flexible hoses 106 which extend upwardly from the nozzles and are connected to a blower (not shown) mounted upon the cotton picker. If desired, means can be provided for controlling the rate of flow of air through the hoses 106 and the nozzles 101 to thereby control air jets from the nozzles 101. As shown particularly in FIGURE 4, the nozzles are disposed so they direct streams of air inwardly and upwardly to cause substantial turbulence and also to cause lifting of the cotton balls so that they can be gathered by the picker mechanism 11.

Operation of our apparatus can now be briefly described as follows. Let it be assumed that the apparatus has been mounted upon a cotton picker as hereinbefore described. As is well known to those skilled in the art of raising cotton, where irrigation is required, the field is normally tilled to provide raised beds 112 with furrows 113 extending between the beds. The cotton is picked from the plants 111 by at least one picking operation. Prior to and during the picking operations, a substantial number of bolls drop to the ground which normally cannot be picked up by the mechanical cotton picker.

After the cotton has been picked in the conventional manner, our apparatus for recovering cotton which has fallen to the ground is attached to the cotton picker by simply connecting it to the picker mechanism 11. The cotton picker is then operated in a conventional manner passing down the rows of cotton. As the cotton picker is advanced, the rotatable pickup members 34 are positively driven by the hydraulic motors 71 at a suitable speed as for example 100 revolutions per minute. The apparatus is of course properly adjusted by the proper positioning of the front and rear ends of the supporting members 43 so that the foremost pickup members extend down into the furrow as shown particularly in FIGURE 3 and so that the pickup members to the rear are inclined inwardly and upwardly on the sides of the bed 112. The springs 81 are adjusted so that the pickup members barely touch the ground or in other words they are adjusted so as to keep the fingers or tines from digging too deeply into the ground.

Thus, as the cotton picker is advanced, each of the wheels is rotating and the fingers or tines 52 engage the ground and sweep the ground to glean any cotton bolls which have fallen to the ground and to kick them inwardly and upwardly from opposite sides into a single row in line with the picker mechanism so that they can be gathered by the pickup mechanism 11 which follows. The tines or fingers 52 are relatively rigid so that they can actually pick up cotton which may be slightly matted to the ground. With the pickup members 34 inclined, staggered and canted in the manner shown it can be seen that the cotton bolls will be picked up and kicked inwardly toward the center of the row of cotton plants which are being covered by the picker mechanism. The cotton bolls will actually be kicked up on top of the bed 112 and underneath the cotton plants 111. As the cotton bolls are picked up by the last or third pickup members, the bolls come into contact with upwardly inclined jets of air from the nozzles 101 which lift the cotton in the row upwardly. Since the cotton picker moves forward continuously these cotton bolls as they are lifted upwardly pass into and are gathered by the picker mechanism. These gathered cotton bolls will be repicked through the spindles and the picker mechanism and cleaned within the cotton picker and then blown into the basket of the cotton picker.

In addition to picking up the scrap cotton which is on the ground, the picker mechanism by passing over the cotton plants again picks any remaining bolls which are not on the plants which were not previously picked. By positive driving the pickup members 34 with the hydraulic motors 71, and pickup members will always be rotating and will therefore always kick the cotton bolls into the center of the row. This eliminates the possibility of the wheels of certain of the pickup members 34 from stopping their rotation when they are not in engagement with the ground as for example when unevenness occurs in the beds 112.

It should be apparent that it is not absolutely necessary to provide separate motive means for driving the pickup members and that if desired, the engagement of the tines or fingers 52 with the ground can be utilized for driving the pickup members 34. It is for this reason we have shown the alternative arrangement in FIGURES 8 and 9.

It should be pointed out that the utilization of separate motive means for the pickup members makes it possible to drive the pickup members at different speeds. This may be particularly advantageous where it is desired to drive the pickup members which are closest to the picker mechanism 11 at greater speeds so as to lift the bolls to a greater height and so that they will in effect be tossed into the picker mechanism. In this manner, it is possible to eliminate the use of the forced air for lifting the cotton bolls. However, we have found that the use of the forced air greatly facilitates the recovery of substantially all of the cotton which is picked up by the pickup members 34 even though certain of the bolls may be lodged under the cotton plants.

Although we have described our apparatus and method for use with a single row cotton picker, it is readily apparent that if desired, the apparatus can be readily provided for two row cotton pickers. It is also apparent that although we have described the apparatus for use primarilly with cotton pickers, the apparatus can be utilized in other applications for picking articles off the ground, as for example, picking nuts.

We claim:

1. In apparatus for recovering cotton which has fallen to the ground, a cotton picker having a vertically adjustable picker mechanism, a pair of arms pivotally mounted on the picker mechanism and extending forwardly and laterally of the picker mechanism, ground engaging wheels secured to the arms and serving to support the outer ends of the arms in a predetermined relationship with respect to the ground, a pair of support members pivotally connected to the outer ends of the arms, means for securing the other ends of the support members to the arms to adjust the vertical positions of the rear portions of the support members with respect to the arms, a plurality of substantially planar wheel-like pickup members, means for mounting a plurality of said pickup members on each of the support members in an overlapping staggered relationship permitting pivotal movement of the pickup members with respect to the support members and permitting independent rotation of the pickup members with respect to each other, yieldable means secured to said support members and to the means for mounting the pickup members on the support members to adjust the force with which the pickup members engage the ground, said pickup members being inclined sideways with respect to the path of travel of the picker mechanism and having the upper ends canted from the vertical, said pickup members serving to pick up the cotton from the ground and to progressively kick it inwardly and rearwardly into a row in the path of travel of the picker mechanism.

2. Apparatus as in claim 1 together with means mounted on the cotton picker supplying upwardly and inwardly directed jets of air to the cotton in the row to lift the cotton upwardly so that it will enter the picker mechanism as the picker mechanism is advanced.

3. Apparatus as in claim 1 wherein said means for mounting a plurality of said pickup members on each of said support members includes an elongate member for each of said pickup members, means for pivotally mounting said elongate member on said support member, and means for rotatably mounting said pickup member on said elongate member.

4. Apparatus as in claim 3 wherein said means for mounting said pickup member on said elongate member includes a shaft rotatably mounted on said elongate member, means for affixing said pickup member to said shaft together with means for rotating said shaft.

5. Apparatus as in claim 4 wherein said means for rotating said shaft consists of a fluid motor and means mounted on said cotton picker for applying fluid under pressure to said hydraulic motor.

6. In apparatus for recovering produce which has fallen to the ground, a ground traversing vehicle, a pair of forwardly extending arms mounted on the vehicle in front of the vehicle, a plurality of substantially planar wheel-like pickup members, means for mounting a plurality of said pickup members on each of said arms permitting pivotal movement of said pickup members with respect to said arms and permitting rotation of said pickup members independently of each other, said means for mounting said pickup members carrying said pickup members so that they are inclined outwardly in a lateral direction with respect to the path of travel of the vehicle and so that they are inclined from the vertical, said arms also being inclined outwardly in a lateral direction with respect to the path of travel of the vehicle so that as the vehicle is advanced, the pickup members pick up produce from the ground and kick it inwardly and rearwardly from opposite sides into a row in the path of travel of the vehicle, and separate drive means for rotating each of the rotatable pickup members independent of each other.

7. In apparatus for recovering produce which has fallen to the ground, a ground traversing vehicle, a pair of forwardly extending arms mounted on the vehicle in front of the vehicle, a plurality of substantially planar wheel-like pickup members, means for mounting a plurality of said pickup members on each of said arms permitting pivotal movement of said pickup members with respect to said arms and permitting rotation of said pickup members independently of each other, said means for mounting said pickup members carrying said pickup members so that they are inclined outwardly in a lateral direction with respect to the path of travel of the vehicle and so that they are inclined from the vertical, said arms also being inclined outwardly in a lateral direction with respect to the path of travel of the vehicle so that as the vehicle is advanced, the pickup members pick up produce from the ground and kick it inwardly and rearwardly from opposite sides into a row in the path of travel of the vehicle, and means for supplying upwardly and inwardly directed jets of air to lift the produce upwardly as it is deposited into the row by the rotatable pickup members.

8. In apparatus for recovering cotton which has fallen to the ground for use on a cotton picker having a vertically adjustable picker mechanism, a pair of arms adapted to be pivotally connected to the picker mechanism, means supporting the outer ends of the arms in a predetermined relationship with respect to the ground being traversed, a plurality of substantially planar wheel-like pickup members, means mounting a plurality of said pickup members on each of said arms permitting independent rotation of each of said pickup members with respect to each other, said arms being inclined outwardly from the path of travel of the vehicle, said rotatable pickup members being inclined outwardly in a lateral direction with respect to the path of travel of the cotton picker and also being inclined from the vertical, said members upon advancement of the cotton picker rotating and engaging cotton bolls upon the ground and kicking them rearwardly and inwardly into a row into the path of travel of the picker mechanism, and means mounted on the cotton picker for supplying jets of air to the cotton bolls which have been deposited in the row in the path of travel of the picker mechanism to lift the cotton bolls upwardly so that they can be gathered by the picker mechanism.

9. In apparatus for recovering cotton which has fallen to the ground for use on a cotton picker having a vertically adjustable picker mechanism, a pair of arms pivotally connected to the picker mechanism, means supporting the outer ends of the arms in a predetermined relationship with respect to the ground being traversed, a plurality of substantially planar wheel-like pickup members, means mounting a plurality of said pickup members on each of said arms permitting independent rotation of each of said pickup members with respect to each other, said arms being inclined outwardly from the path of travel of the vehicle, said rotatable pickup members being inclined outwardly in a lateral direction with respect to the path of travel of the cotton picker and also being inclined inwardly from the vertical, said members upon advancement of the cotton picker rotating and engaging cotton bolls upon the ground and kicking them rearwardly and inwardly into a row into the path of travel of the picker mechanism, and separate motive means for rotating each of the rotatable pickup members independent of each other.

10. In apparatus for recovering cotton which has fallen to the ground for use on a cotton picker having a vertically adjustable picker mechanism, a pair of arms pivotally connected to the picker mechanism, means supporting the outer ends of the arms in a predetermined relationship with respect to the ground being traversed, a plurality of substantially planar wheel-like pickup members, means mounting a plurality of said pickup members on each of said arms permitting independent rotation of each of said pickup members with respect to each other, said arms being inclined outwardly from the path of travel of the vehicle, said rotatable pickup members being inclined outwardly in a lateral direction with respect to the path of travel of the cotton picker and also being inclined from the vertical, said members upon advancement of the cotton picker rotating and engaging cotton bolls upon the ground and kicking them rearwardly and inwardly into a row into the path of travel of the picker mechanism, and means for adjusting the vertical position of said pickup members with respect to said arms.

11. In apparatus for recovering cotton which has fallen to the ground, a cotton picker having a vertically adjustable picker mechanism for traveling over a row of cotton plants, a pair of substantially planar wheel-like pickup members and means for mounting said wheel-like pickup members on said picker mechanism in front of the picker mechanism on opposite sides of the row of cotton plants over which the picker mechanism is to travel to permit vertical movement of the same with respect to the picker mechanism, said means mounting the wheel-like pickup members serving to mount said pickup members so that they are inclined outwardly in a lateral direction with respect to the path of travel of the cotton picker and are also inclined from the vertical, said pickup members being adapted to engage the ground and upon movement of the cotton picker rotating and engaging cotton bolls upon the ground and kicking them rearwardly and inwardly into a row in the path of travel of the picker mechanism, and means mounted on the cotton picker for supplying upwardly and inwardly directed jets of air to lift the cotton bolls into the picker mechanism as they are deposited into the row by the rotatable pickup members.

12. In apparatus for recovering cotton which has fallen to the ground, a cotton picker having a vertically adjustable picker mechanism adapted to move over a row of cotton plants to pick cotton therefrom, a pair of arms pivotally connected to the picker mechanism on opposite sides thereof and having outer ends movable in a vertical direction with respect to the picker mechanism, means supporting the outer ends of the arms with respect to the ground being traversed, a plurality of additional arms, means pivotally mounting a plurality of said additional arms on each of said first named arms to permit the outer ends of said additional arms to move freely in a vertical direction independent of each other and with respect to the said first named arms, a plurality of wheel-like pickup members disposed on opposite sides of the picker mechanism and having a staggered overlapping relationship on each side of the picker mechanism, means rotatably mounting said wheel-like pickup members on said additional arms to permit independent rotation of the wheel-like pickup members with respect to each other, said additional arms and said means for mounting said wheel-like pickup members on said additional arms being arranged so that said wheel-like pickup members are inclined outwardly in a lateral direction and divergent forwardly with respect to the path of travel of the cotton picker and so that they are inclined from the vertical, said wheel-like pickup members being adapted to engage the ground whereby upon forward movement of the cotton picker, the wheel-like pickup members are rotated and engage the cotton bolls upon the ground and kick them rearwardly and inwardly into a row in the path of travel of the picker mechanism so that they can be picked up by the picker mechanism as the cotton plants are being picked by the picker mechanism.

13. In an apparatus for recovering cotton which has fallen to the ground, a cotton picker having a vertically adjustable picker mechanism adapted to move over a row of cotton plants to pick cotton therefrom, a pair of arms pivotally connected to the picker mechanism on opposite sides thereof and having their outer ends movable in a vertical direction with respect to the picker mechanism, means supporting the outer ends of the arms with respect to the ground being traversed, a pair of additional arms, means pivotally mounting one of said additional arms on each of said first named arms to permit the outer ends of said additional arms to move freely in a vertical direction independently of each other and with respect to said first named arms, a pair of wheel-like pickup members, disposed on opposite sides of the picker mechanism, means for rotatably mounting one of said wheel-like pickup members on each of said additional arms to permit independent rotation of the wheel-like pickup members with respect to each other, said additional arms and said means for rotatably mounting said wheel-like pickup members on said additional arms being arranged so that said wheel-like pickup members are inclined outwardly in a lateral direction and divergent forwardly with respect to the path of travel of the cotton picker and so that they are inclined from the vertical, said wheel-like pickup members being adapted to engage the ground whereby upon forward movement of the cotton picker, the wheel-like pickup members are rotated and engage the cotton bolls upon the ground and kick them rearwardly and inwardly into a row in the path of travel of the picker mechanism so that they can be picked up by the picker mechanism as the cotton plants are being picked by the picker mechanism.

References Cited by the Examiner
UNITED STATES PATENTS

| | | | |
|---|---|---|---|
| 938,864 | 11/09 | Houghton | 56—29 |
| 1,105,235 | 7/14 | Appleby | 56—29 |
| 1,938,264 | 12/33 | Templeton | 56—1 |
| 1,967,924 | 7/34 | Court | 56—14 |
| 2,766,576 | 10/56 | Van der Lely | 56—345 |
| 2,770,937 | 11/56 | Huddle | 56—1 |
| 2,845,769 | 8/58 | Hintz et al. | 56—344 |
| 2,938,321 | 5/60 | Tieman | 56—12 |
| 3,135,082 | 6/64 | Czajkowski | 56—28 |

ANTONIO F. GUIDA, *Acting Primary Examiner*.

RUSSELL R. KINSEY, T. GRAHAM CRAVER,
*Examiners*.